United States Patent [19]

Schaeffer

[11] Patent Number: 5,048,116

[45] Date of Patent: Sep. 10, 1991

[54] SIGNAL ROUTING SYSTEM

[75] Inventor: Dennis R. Schaeffer, Buffalo Grove, Ill.

[73] Assignee: Motorola, Inc., Schaumburg, Ill.

[21] Appl. No.: 356,160

[22] Filed: May 24, 1989

[51] Int. Cl.⁵ .......................................... H04M 11/00
[52] U.S. Cl. ..................................... 455/33; 455/103
[58] Field of Search .................... 455/33, 67, 134, 272, 455/275, 277, 51, 103, 56; 379/59, 60, 62; 370/84

[56] References Cited

U.S. PATENT DOCUMENTS

| | | | |
|---|---|---|---|
| 3,800,222 | 3/1974 | Kowalewski | 325/23 |
| 3,906,405 | 9/1975 | Kommusch | 333/17 M |
| 4,144,496 | 3/1979 | Cunningham | 455/33 |
| 4,188,582 | 2/1980 | Cannalte et al. | 455/51 |
| 4,213,132 | 7/1980 | Davidson | 343/854 |
| 4,317,229 | 2/1982 | Craig et al. | 455/277 |
| 4,369,520 | 1/1983 | Cemy, Jr. et al. | 455/137 |
| 4,375,622 | 3/1983 | Hollingsworth | 333/126 |
| 4,584,713 | 4/1986 | Bruckert et al. | 455/277 |
| 4,629,906 | 12/1986 | Heffner | 307/80 |
| 4,661,992 | 4/1987 | Garay et al. | 455/89 |
| 4,669,107 | 5/1987 | Eriksson | 379/60 |
| 4,704,734 | 11/1987 | Menich | 455/33 |
| 4,797,947 | 1/1989 | Labedz | 455/56 |
| 4,887,265 | 12/1989 | Felix | 370/94.1 |
| 4,955,082 | 2/1990 | Hattori et al. | 455/33 |

OTHER PUBLICATIONS

"Capacity Dynamics in Cellular Mobile Telephone Systems"–Telecommunications Magazine, Feb. 1983.

Primary Examiner—Curtis Kuntz
Attorney, Agent, or Firm—Kenneth W. Bolvin

[57] ABSTRACT

A signal routing system for use in cellular RF communications systems wherein a signal can be routed to different antennas, effectively switching transmitters between antennas. The switching is accomplished by placing a frequency responsive device between a transmitter and each antenna. The transmitter is then coupled to an antenna through the frequency responsive device that has a resonant frequency equal to the transmitter's frequency. If the transmitter changes frequency, it will be switched to the appropriate antenna through the corresponding frequency responsive device. This system permits a sector of a cell to increase the number of frequencies in that sector to handle increased mobile traffic loads.

14 Claims, 2 Drawing Sheets

SIGNAL ROUTING SYSTEM

TECHNICAL FIELD

This invention relates generally to signal routing. More particularly, this invention relates to an antenna switching system for cellular RF communications.

BACKGROUND OF THE INVENTION

A cellular RF communications cell consists of a plurality of low power transmitters, each permanently coupled to an antenna. The antennas are arranged such that each radiates from the center of the cell in 60° sectors, thereby forming a hexagonal shaped cell. A plurality of these cells are combined to form a cellular RF communications system. The system is linked to landline telephone networks allowing mobile traffic to communicate with the telephone networks through the cellular system.

The landline telephone networks can communicate with mobile traffic using either Time Division Multiplexing (TDM) or Frequency Division Multiplexing (FDM) techniques. Using TDM, it is possible to map a plurality of traffic channels onto each transmitter's carrier by dividing the carrier into a plurality of time slots. This allows a greater number of channels to be transmitted in a given time than would be allowed if only one channel was transmitted per carrier. TDM, therefore, increases the efficiency of the cell's frequencies. TDM is now being introduced into cellular systems. Using FDM, a plurality of transmitters can simultaneously transmit signals of different frequencies from the same antenna without one signal interfering with another. FDM is commonly employed in the cellular systems at the present.

Cellular systems achieve large traffic handling capabilities through the reuse of frequencies in a number of cell sites within the same metropolitan area. The low transmission power and the placement of the antennas allows the quality of the speech signal to remain above an acceptable threshold. This threshold is referred to in the art as the Carrier to Interference ratio (C/I). C/I is a ratio of the signal strength of the received desired carrier to the signal strength of the received interfering carriers. A number of physical factors can effect C/I in cellular systems: buildings, geography, antenna radiation patterns, mobile traffic transmitting power, and mobile traffic location within the cell.

Presently, a four cell reuse pattern in one of the densest frequency reuse patterns which produces an acceptable C/I. U.S. Pat. No. 4,128,740 to Graziano for an antenna array for a cellular RF communications system describes such a four cell frequency reuse pattern. While the four cell frequency reuse pattern permits closer reuse of the co-channel frequencies and thus provides higher traffic capacity, it introduces an inefficiency in that the total number of channels available to the cellular system are divided into more groups of frequencies. This partitioning results in fewer channels available in a given sector and can lead to situations where specific sectors cannot handle the traffic.

Cellular systems are being used with increasing regularity by both business and personal mobile traffic. This increased utilization has created a problem with frequency use in large metropolitan areas. When a fixed sector has more mobile traffic than available frequencies, the sector must ignore the excess traffic until a frequency is free. Due to both frequency limitations by relevant government authorities and the four cell reuse pattern, new frequencies cannot always be added to the cell to alleviate this problem. There exists a need, therefore, for a way to improve traffic handling capabilities of cellular communications sites.

SUMMARY OF THE INVENTION

This need and other are met through the method and system of signal routing described in this specification. The system includes a transmission source coupled to a plurality of communication paths. Additionally, each communication path contains a frequency responsive device that allows only signals of a certain frequency to pass. Each frequency responsive device is coupled to an antenna.

This invention uses the frequency of the signals from the transmission sources to control the routing of the signals to the antennas, effectively switching transmitters between antennas. When a sector has a higher amount of mobile traffic than it can handle, another transmitter can be switched onto the antenna transmitting in that sector. This will increase the number of frequencies or time slots in that sector, thereby relieving the congestion in that sector.

By using this invention, transmitters can be switched between antennas as required by traffic loading. Sectors with low or no traffic sectors can be left with fewer or no frequencies or time slots while the higher traffic sectors are assisted by the switched frequencies or time slots. While this switching method will enhance current FDM cellular systems, it is particularly suited to TDM systems where fast transmitter switching is needed.

BEST MODE FOR CARRYING OUT THE INVENTION

Figure 1:
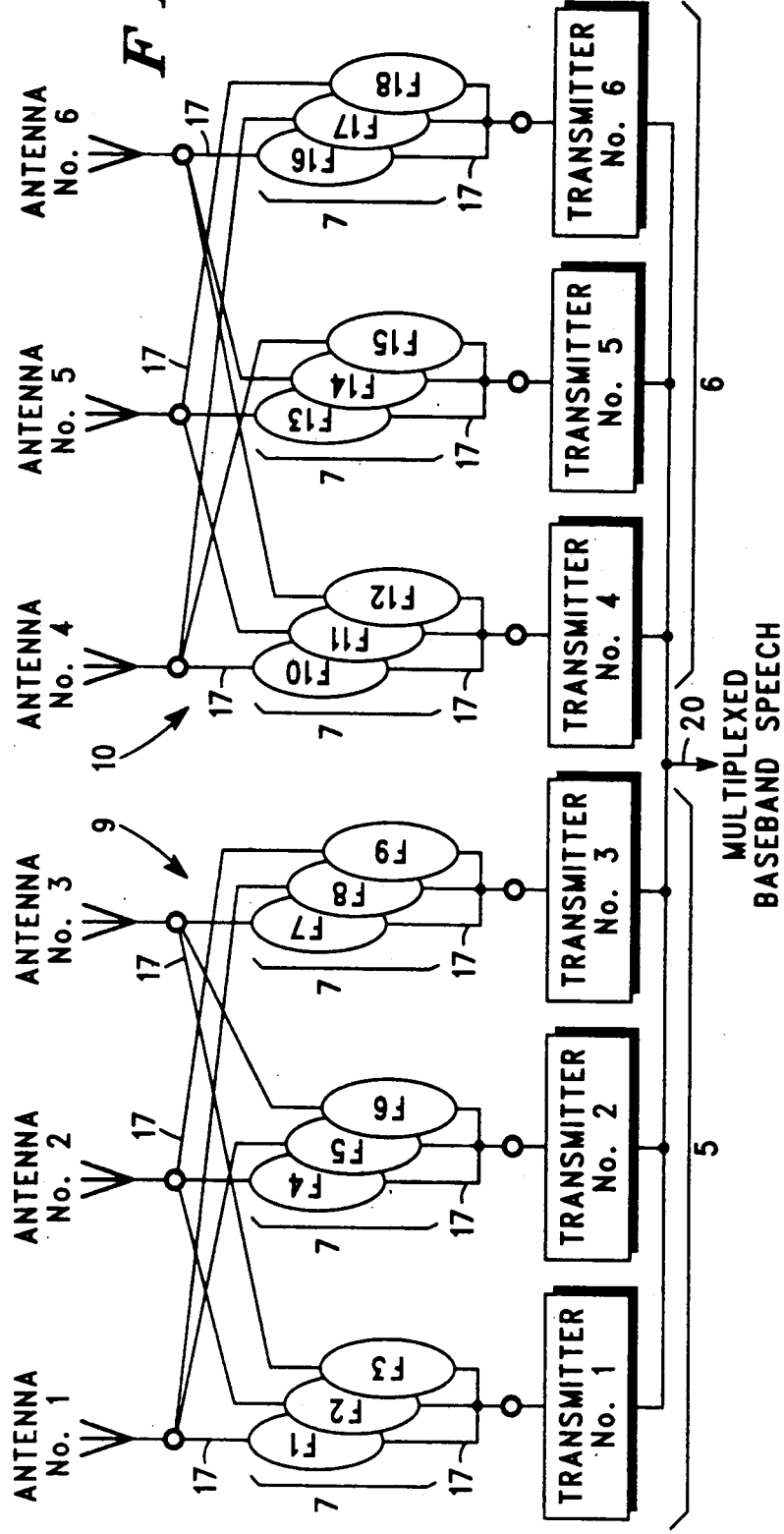
FIG. 1 is a block diagram of a cell configuration, using nine different frequencies per antenna group, in accordance with the present invention.

Referring now to the drawings, FIG. 1 shows a configuration of a cell using this invention. Six transmitters with frequency synthesizers, Transmitter 1–Transmitter 6, are divided into two groups of three transmitters (5 and 6). Each transmitter is connected by phasing lines (17) to three tuned resonant cavities (7). A tuned resonant cavity not at a signal's resonant frequency causes an improper line termination on the phasing line which will cause the cavity to appear as a high impedance. In other words, the phasing lines convert a tuned resonant cavity's low impedance into a high impedance for signals not at the cavity's resonant frequency. This prevents signals not at a cavity's resonant frequency from being shorted to ground through that cavity.

Each of the three tuned resonant cavities (7) is connected by phasing lines (17) to one of three antennas in its group (9 and 10). In one configuration, such as shown in FIG. 1, each tuned resonant cavity (7) is tuned to a different frequency thereby allowing only signals at those frequencies to pass through the cavities to the antennas. For example, if Transmitter 1, in FIG. 1, transmits a signal at a frequency of F1, the signal will be coupled to Antenna 1. If Transmitter 1 changes frequency to F2, the signal will be coupled to Antenna 2. The tuned resonant cavities will not cause any appreciable switching delays. Using this frequency changing method, a transmitter can control the routing of the signal.

Figure 3:
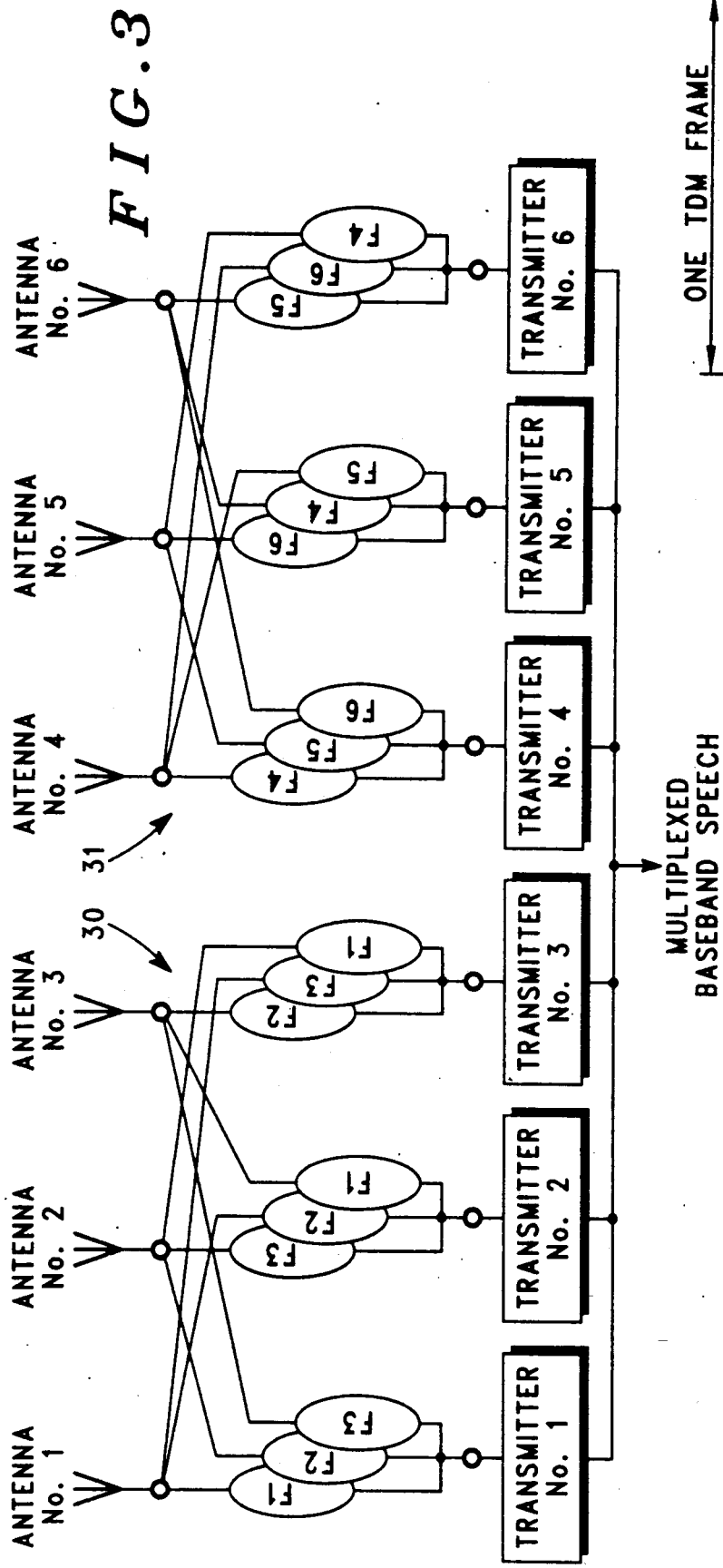
FIG. 3 is a block diagram of a cell configuration, using three different frequencies per antenna group, in accordance with the present invention.

The concept illustrated by FIG. 1 assumes nine different frequencies are available. It is also possible to configure the system with a lesser number of different frequencies per antenna group (9 and 10). FIG. 3 illustrates such a configuration with only three different frequencies per antenna group (30 and 31).

Figure 2:
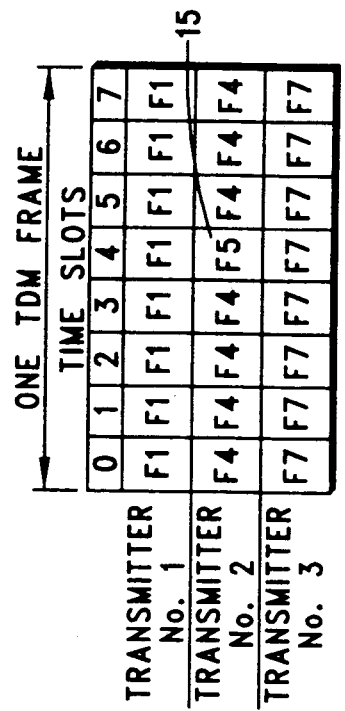
FIG. 2 is a time division multiplexed frequency allocation example for a three transmitter system in accordance with the present invention.

FIG. 2 shows an example of a frequency allocation scheme, as applied to FIG. 1, to accomplish TDM in a three transmitter system (5). When Transmitter 1 is overburdened by mobile traffic, an unused time slot (15) can be borrowed from Transmitter 2. This is accomplished by tuning Transmitter 2 to F5, the resonant frequency of the tuned resonant cavity connecting Transmitter 2 to Antenna 1 in FIG. 1. This will switch Transmitter 2 to the overburdened Antenna 1 thereby doubling the number of frequencies being transmitted in that sector. After the time slot is over, Transmitter 2 will be retuned to F4 to allow it to resume transmitting on Antenna 2. This three transmitter TDM scheme is similar to the one which can be used in a signal routing system with a larger number of transmitters.

The baseband multiplexer (20) is necessary to support a frequency hopping mode of operation. According to FIG. 1, mobile traffic that is in the coverage area of antenna 1 would be assigned frequencies F1, F5, and F7 to hop over. This implies that Transmitter 1 operates on F1, Transmitter 2 operates on F5 and Transmitter 3 operates on F7. If the mobile is assigned to time slot 4 during the first frame, the multiplexer would switch the baseband speech associated for that particular mobile traffic to Transmitter 1 on F1 time slot 4. The mobile traffic would receive the speech information and tune its receiver to F5 in preparation to receive the next speech block. The multiplexer would then switch the baseband speech associated with that particular mobile traffic to Transmitter 2 prior to the transmission of time slot 4. The mobile would now receive the speech information on Transmitter 2 time slot 4. This same operation would be performed on Transmitter 3 and the mobile traffic would repeat the entire cycle of receiving speech on frequencies F1, F5, and F7 repeatedly throughout the entire call.

Figure 4:
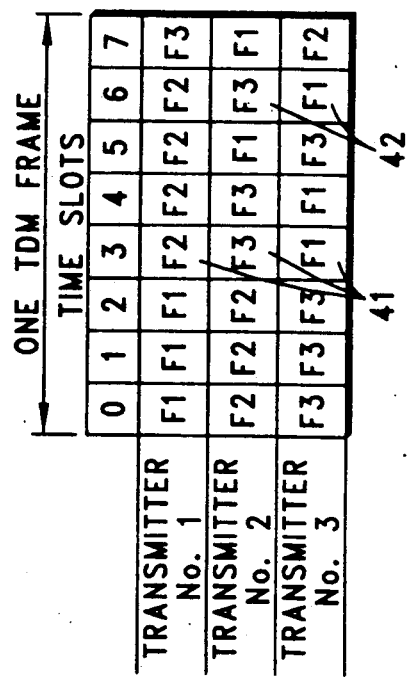
FIG. 4 is a time division multiplexed frequency allocation example for a three transmitter system with simultaneous switching of time slots in accordance with the present invention.

FIG. 4 shows an example of a frequency allocation scheme, as applied to FIG. 3, to accomplish TDM in a three transmitter system using three frequencies. This figure indicates two (42) and three (41) transmitters changing frequencies simultaneously. This operation is necessary to prevent the simultaneous transmission on the same frequency by two of the transmitters. The simultaneous switching of all three transmitters (41) is particularly suited to frequency hopping in that a full set of frequencies for a particular time slot are moved to an antenna. In this example, Antenna 2 in FIG. 3 is transmitting all three frequencies. While this example shows only one frame of 8 time slots, the concept can be expanded to multiple frames with a larger or smaller number of time slots.

Using this invention, the transmitters in a cell site can be switched between antennas as shown previously. When a sector within a cell does not have enough frequencies to handle the mobile traffic within that sector, other transmitters, by changing frequencies, can be switched to the overburdened sector. This will increase the number of frequencies within that sector, thereby allowing all the traffic within that sector to be served by a frequency.

I claim:

1. A signal routing system for dynamically switching frequencies among a plurality of antennas of a cell, each antenna radiating into a different sector of the cell, the system comprising:
   a) a signal transmission source for generating a plurality of signals;
   b) a plurality of communication paths, coupled to the signal transmission source, for conducting the plurality of signals; and
   c) a plurality of frequency responsive means, each frequency responsive means coupled to a different communication path, for allowing a first signal of the plurality of signals to be supported by a particular communication path only when the first signal has a predetermined frequency.

2. The signal routing system of claim 1 wherein the signal transmission source is a transmitter with a synthesizer capable of changing frequency within a predetermined time.

3. The signal routing system of claim 1 wherein the signal transmission source controls routing of the plurality of signals.

4. The signal routing system of claim 1 wherein the frequency responsive means includes a tuned resonant cavity responsive to a predetermined frequency.

5. The signal routing system of claim 1 wherein at least one of the plurality of communication paths is a phasing line.

6. A signal routing system for dynamically switching frequencies among a plurality of antennas of a cell, each antenna radiating into a different sector of the cell, the system comprising:
   a) a plurality of signal transmission sources for generating a plurality of signals;
   b) a plurality of communication paths, coupled to the plurality of signal transmission sources, for conducting the plurality of signals; and
   c) a plurality of frequency responsive means, each frequency responsive means coupled to a different communication path, for allowing a first signal of the plurality of signals to be supported by a particular communication path only when the first signal is of a predetermined frequency.

7. The signal routing system of claim 6 wherein the signal transmission sources control routing of the signals.

8. The signal routing system of claim 6 wherein the frequency responsive means includes tuned resonant cavities.

9. The signal routing system of claim 6 wherein at least one of the plurality of communication paths is a phasing line.

10. The signal routing system of claim 6 wherein the signal transmission sources are transmitters with synthesizers capable of changing frequency within a predetermined time.

11. The signal routing system of claim 10 wherein the transmitters are coupled to the antennas by tuned resonant cavities.

12. The signal routing system of claim 6 wherein the plurality of antennas forms an array, a plurality of subsets of the antenna array form a plurality of subarrays, and the plurality of signal transmission sources are coupled to the antennas in a configuration such that each signal transmission source in a first subarray is unable to be coupled to antennas in other subarrays.

13. A signal routing device for routing frequencies, generated by a plurality of variable frequency signal transmission sources, between a plurality of antennas of an antenna array, a subset of the plurality of antennas forming a subarray of the antenna array, a subset of the plurality of variable frequency signal transmission sources being able to transmit from a first subarray and not from a second subarray, the device comprising:
 a) a plurality of communication paths, coupling the plurality of variable frequency signal transmission sources to the plurality of antennas, for transmitting the plurality of frequencies; and
 b) a plurality of frequency responsive means, each means tuned to a predetermined frequency and coupled to a separate communication path of the plurality of communication paths, the means allowing a frequency to be supported by a communication path when the frequency is the same as the predetermined frequency.

14. A method for routing signals to a plurality of antennas of a cell, the signals generated by at least one variable frequency signal transmission source, the at least one variable frequency signal transmission source coupled to the plurality of antennas by a plurality of communication paths, each communication path having a frequency responsive means tuned to a different predetermined frequency, the cell providing communication capability to mobile traffic, the method comprising the steps of:
 a) generating a signal of a first predetermined frequency for transmission by a first antenna, the first antenna coupled to a first frequency responsive means tuned to the first predetermined frequency; and
 b) in response to the mobile traffic, generating a signal of a second predetermined frequency for transmission by a second antenna, the second antenna coupled to a second frequency responsive means tuned to the second predetermined frequency.

* * * * *